June 30, 1931.  W. BRAUER  1,812,681
KEY BUSHING FOR ROCK BIT REAMER PINS
Filed Feb. 13, 1929
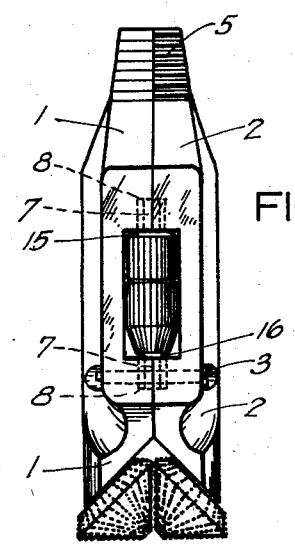
FIG. 1.
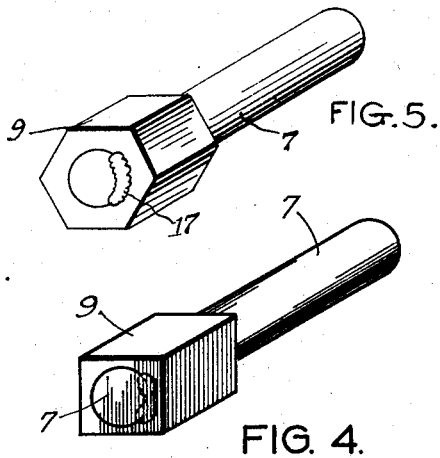
FIG. 5.
FIG. 4.
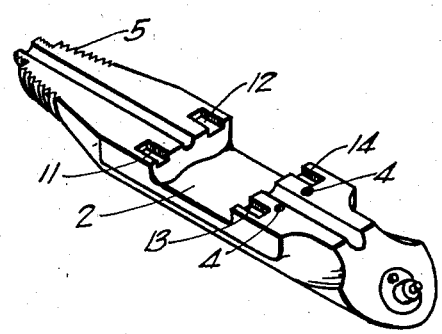
FIG. 2.
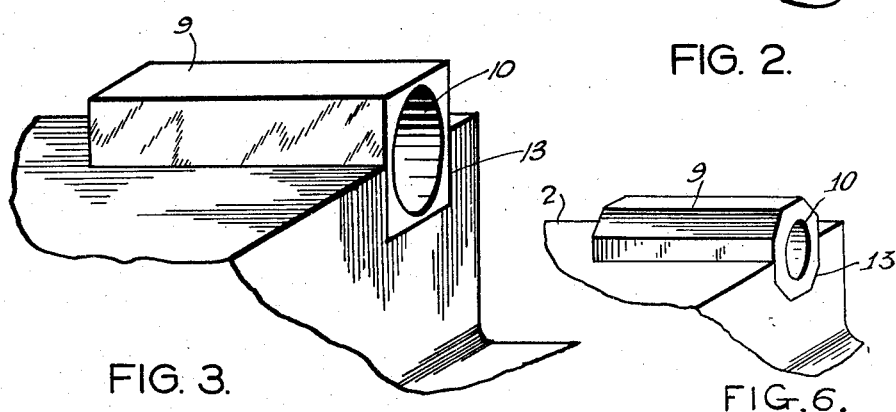
FIG. 3.
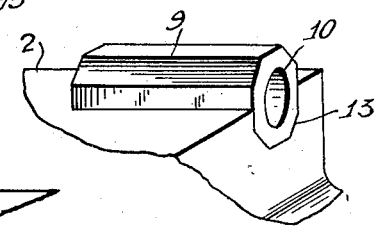
FIG. 6.
Walter Brauer INVENTOR
BY Loyal J. Miller
ATTORNEY Patented June 30, 1931

1,812,681

UNITED STATES PATENT OFFICE

WALTER BRAUER, OF SEMINOLE, OKLAHOMA

KEY BUSHING FOR ROCK-BIT REAMER PINS

Application filed February 13, 1929. Serial No. 339,623.

My invention relates to improvements in a bushing for rock-bit reamer pin which can also be used as a key.

The objects of my invention are to produce a device of the character described which will be new, novel, useful and of utility; which will be cheap of construction; which will be easily placed and installed; which will be easily replaced when worn; which will prevent the faces of the separate portions of the body of the bit from galling and wearing; which will prevent the necessity of taking the bit apart and sending it in for re-forming and repairing; which will save much loss of time in drilling a well; a device which will provide a seat for the rock-bit reamer pin within said body member of drill bit; which will be useful for all of the purposes for which it is intended.

The usual bit now in use for such purposes comprises two halves of a body member adapted to close together and house pins.

In the present type of drill-bit which has reamer rollers revolving on reamer pins, there is a considerable amount of wear between the body members of the bit. This is caused by the ends of the reamer pins working loose in their respective reamer pin slots, allowing the body members to slip back and forth, which in turn causes the shank to gall in the drill collar. When this happens it is necessary to have the reamer pin slots built up and re-machined as well as to have the inside surfaces of the bit body members re-planed or re-surfaced, and the threads on drill shank re-made. The average oil field is not equipped to do this work, and it is therefore usually necessary to ship the whole bit some distance to a machine shop with proper equipment. It also necessitates the re-threading of the drill stem. This of course is quite expensive as to transportation as well as to the actual repairs to the bit, and causes considerable loss of time. It is also necessary to renew or re-place the reamer pins. In my invention, which is particularly adaptable to what is known in the art as a, "Hughes simplex rock bit", I stop the friction between the two half body members of the drill bit, and stop the wear between the end of the reamer pins and their slots, by a bushing, to be made of bronze or other suitable material, which also acts as a key to keep the two halves of said bit body members rigidly together. It will be seen as is hereinafter described that if there is any wear on the ends of reamer pins which fit into my proposed key bushing for rock bit reamer pins, that it will not allow the halves of said bit body members to loosen and cause friction. Reamer pins and key bushing for rock bit reamer may be re-placed quickly, and with comparatively small expense, and upon the drilling site.

With these and other objects in view as will more fully appear my invention consists in the construction, novel, features, and combination of parts hereinafter more fully described, pointed out in the claims hereto appended, and illustrated in the accompanying one-sheet drawing, of which, Figure 1 is a side elevational view of a "Hughes simplex rock bit"; Fig. 2 is a perspective view of one half of body member of said bit, showing square seats or slots for key bushing for reamer pins; Fig. 3 is a fragmentary perspective view showing the square form and seating of said bushing; Fig. 4 is a perspective view showing one of reamer pins welded integral with key bushing, Fig. 5 is a perspective view of one embodiment of my device; Fig. 6 is a fragmentary perspective view showing the octagonal form and setting of the bushing.

Like characters of reference designate like parts in all the figures.

It will be observed in Figure 1 that the drill bit is mainly composed of two body member halves 1 and 2, which are held together at their lower end by through-bolts 3 passing through holes as at 4 in body members 1 and 2. The upper end of said body members 1 and 2 are held together at their threaded ends as indicated at 5 which are when in use screwed into the drill stem of any standard rotary drilling outfit. Reamer rollers 6 revolve on reamer pins 7 which are equipped with washers 15 and 16 to take wear off the ends of said reamer rollers and seats of said respective bit body halves. The ends of said reamer pins 7 are stationary in reamer pin slots as at 8. Said slots are cylindrical shaped, each half of body members 1 and 2 forming half of each of said slots.

My invention is a key bushing 9 with the outside of same being square as shown in Figs. 3 and 4 and with a round hole 10 through the center, but which could be formed in other shapes on the outside such as octagonal, hexagonal, and the like, as shown in Figs. 6 and 5, respectively. The exterior of key bushings 9 form keys which fit in the key slots 11, 12, 13 and 14 (better seen in Fig. 2), holding the two halves of body members 1 and 2 rigidly from any side slipping or friction. Key slots 11, 12, 13 and 14 are formed one-half each in body members 1 and 2. The lower ends of reamer pins 7 are welded, as shown at 17, into key bushing 9 to keep them from turning in key bushings when bit is in operation (see Fig. 4 and Fig. 5).

It will be seen that by disconnecting drill bit from drill shaft by unscrewing at point 5, and then by removing through-bolt 3, that drill bit body members 1 and 2 may be taken apart readily allowing the replacement of reamer parts and key bushings. This can all be done without the removal of the bit from the drilling site.

Obviously, the invention is susceptible of embodiment in forms other than that which is illustrated in the accompanying drawings and described herein, and applicable for the uses and purposes other than as detailed, and I therefore consider as my own all such modifications and adaptations and other uses of the form of the device herein described as fairly fall within the scope of my invention.

Having thus described my invention what is claimed and desired to be secured by Letters Patent, is:

1. A device of the class described, comprising a bushing of suitable material, being adapted for use in alined pairs, each bushing having a bore for receiving and seating an end of a reamer pin, said reamer pin for carrying cutters thereon, one of said bushings having one end of said reamer pin securely fastened in the bore thereof, the other alined bushing adapted to fit and seat the other end of said reamer pin in the bore thereof, said bushings being adapted for seating one half each in alined grooves of the two body halves of a rock bit.

2. The combination with the two halves of a rock drilling bit, each of said halves being provided with a plurality of alined grooves adjacent their central portion for receiving and seating one half of a bushing, and with a reamer pin, said reamer pin carrying cutters thereon, of a device of the class described, comprising a bushing of a suitable material for use in alined pairs, each bushing having a bore for receiving said reamer pin, one of said bores having one end of said reamer pin securely fastened therein, the bore of the bushing alined therewith adapted to fit and seat the other end of said reamer pin, one half of each of said bushings being adapted for fitting and seating in said grooves in said respective halves of said bit and to act as a key for said halves.

3. A device of the class described, comprising a square shaped bushing of a suitable material, being adapted for use in alined pairs, each bushing having a cylindrical bore for receiving and seating one end of a reamer pin, said reamer pin having cutters thereon, one of said bushings having one end of said reamer pin securely fastened in the bore thereof, the other alined bushing adapted to fit and seat the other end of said reamer pin in the bore thereof, said bushings being adapted for seating one-half each in alined grooves of the two body halves of a rock bit, said aligned grooves of the two body halves being squared to receive square bushings.

4. A device of the class described, comprising a bushing, polygonal in cross-section, adapted for use in alined pairs, each bushing having a bore for receiving and seating an end of a reamer pin securely fastened in the bore thereof, said pin for carrying a cutter thereon, the other alined bushing adapted to fit and seat the other end of said reamer pin in the bore thereof, the central portion of said reamer pin being cylindrical, said bushings adapted for seating one half each in complemental alined grooves in the two body halves of a rock bit.

WALTER BRAUER.